United States Patent [19]

BEST AVAILABLE COPY

Antoszewski

[11] 3,895,187

[45] July 15, 1975

[54] RECEIVERS FOR PLURAL FREQUENCY SIGNALLING SYSTEMS

[75] Inventor: Eugenius Antoszewski, Stafford, England

[73] Assignee: The General Electric Company Limited, London, England

[22] Filed: July 30, 1974

[21] Appl. No.: 493,165

Related U.S. Application Data

[63] Continuation-in-part of Ser. No. 320,935, Jan. 4, 1973, abandoned.

[30] Foreign Application Priority Data

Jan. 6, 1972 United Kingdom .................. 713/72

[52] U.S. Cl. .................................. 178/88; 325/320

[51] Int. Cl. ............................................ H04b 1/16

[58] Field of Search ............ 325/30, 320, 467, 473, 325/474, 477; 178/66 A, 66 R, 88; 329/104, 112

[56] References Cited

UNITED STATES PATENTS

| | | | |
|---|---|---|---|
| 3,270,285 | 8/1966 | Thomas | 178/88 |
| 3,348,153 | 10/1967 | Featherston | 325/320 |
| 3,353,102 | 11/1967 | Meyers | 325/320 |
| 3,422,357 | 1/1969 | Browne | 325/320 |
| 3,501,704 | 3/1970 | Webb | 325/320 |

*Primary Examiner*—Robert L. Griffin
*Assistant Examiner*—Jin F. Ng
*Attorney, Agent, or Firm*—Kirschstein, Kirschstein, Ottinger & Frank

[57] ABSTRACT

A receiver for use in signalling systems employing frequency shift modulation techniques incorporates means for minimising the possibility of incorrect operation due to noise. In addition to the usual circuits for recognising the transmitted frequencies, the receiver includes further frequency recognition circuits to provide a cross-blocking facility whereby when one of the main frequency circuits is operative the other is blocked. Circuits for preventing incorrect receiver operation under abnormal conditions e.g. loss of signal, are also provided.

7 Claims, 5 Drawing Figures

RECEIVERS FOR PLURAL FREQUENCY SIGNALLING SYSTEMS

This application is a continuation-in-part of United States patent application Ser. No. 320,935, filed 4th January, 1973 now abandoned.

The invention relates to receivers for plural frequency signalling systems employing frequency shift modulation techniques, i.e. systems in which data is conveyed by transmitting in sequence signals of different frequencies.

Telephone lines are commonly used as transmission paths in such signalling systems. However, the noise existing on such lines can cause incorrect operation of a receiver. It is clearly important that this possibility is minimised, and it is an object of the present invention to provide a receiver incorporating novel means for minimising this possibility.

Accordingly, this invention provides a receiver for use in a signalling system of the kind wherein data is conveyed by transmitting in sequence signals of a first frequency and signals of a second higher frequency comprising: first and second frequency recognition circuits which respectively produce outputs in response to received signals in first and second discrete frequency bands in which said first and second frequencies lie respectively; third and fourth frequency recognition circuits which respectively produce outputs in response to received signals in said first and second frequency bands; a connection between the output of said third frequency recognition circuit and said second frequency recognition circuit whereby the output of said second frequency circuit is inhibited in the presence of an output signal from said third frequency recognition circuit; a connection between the output of said fourth frequency recognition circuit and said first frequency recognition circuit whereby the output of said first frequency recognition circuit is inhibited in the presence of an output signal from said fourth frequency recognition circuit; and bistable output means connected with the outputs of the first and second frequency recognition circuits so as to assume a first condition in response to an output from the first frequency recognition circuit and to assume a second condition in response to an output from the second frequency recognition circuit.

The invention will be more readily understood from the following description of a preferred embodiment of a receiver taken in conjunction with the accompanying drawings in which:

FIGS. 1*a* and 1*b* together form a block diagram of a receiver;

The receiver is intended for use in a multichannel data transmission system. The system may, for example, employ seven channels having centre frequencies ranging from 600 Hz to 3480 Hz with 480 Hz spacing between them so that the first channel has a centre frequency of 600 Hz, the second channel a centre frequency of 1080 Hz and so on.

The system employs a separate transmitter and a separate receiver for each channel the transmitters being connected to their associated receivers via a common two-wire transmission line such as a pair of telephone lines. In each channel data is conveyed by transmitting a carrier wave of sinusoidal form whose frequency is changed in accordance with the data to be transmitted between values 100 Hz above and 100 Hz below the channel centre frequency.

The particular receiver to be described is intended for use in an electric power transmission line protective relaying system. In such an application the lower carrier frequency is normally transmitted in a channel when the power line is fault free and the higher carrier frequency is transmitted when a fault occurs on the power line. When a fault occurs a circuit breaker associated with the power line is normally required to be tripped and the higher carrier frequency is therefore conventionally, and hereinafter, referred to as the trip frequency. Similarly, when the power line is fault-free it is desirable to guard against the operation of the circuit breaker and the lower carrier frequency is therefore conventionally, and hereinafter, referred to as the guard frequency.

Figure 1A:
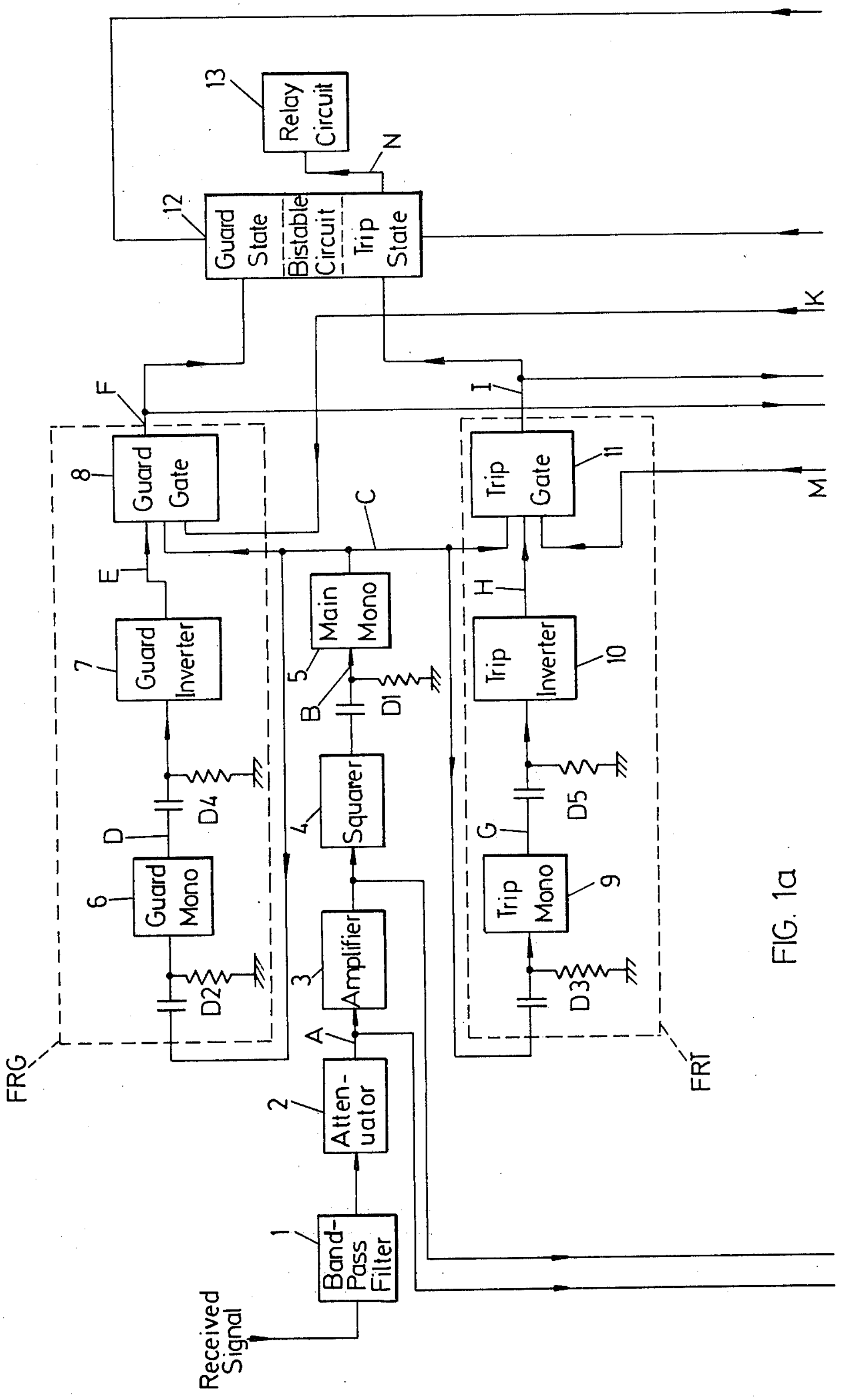
FIGS. 1*a* and 1*b* are joined together.
Figure 3:
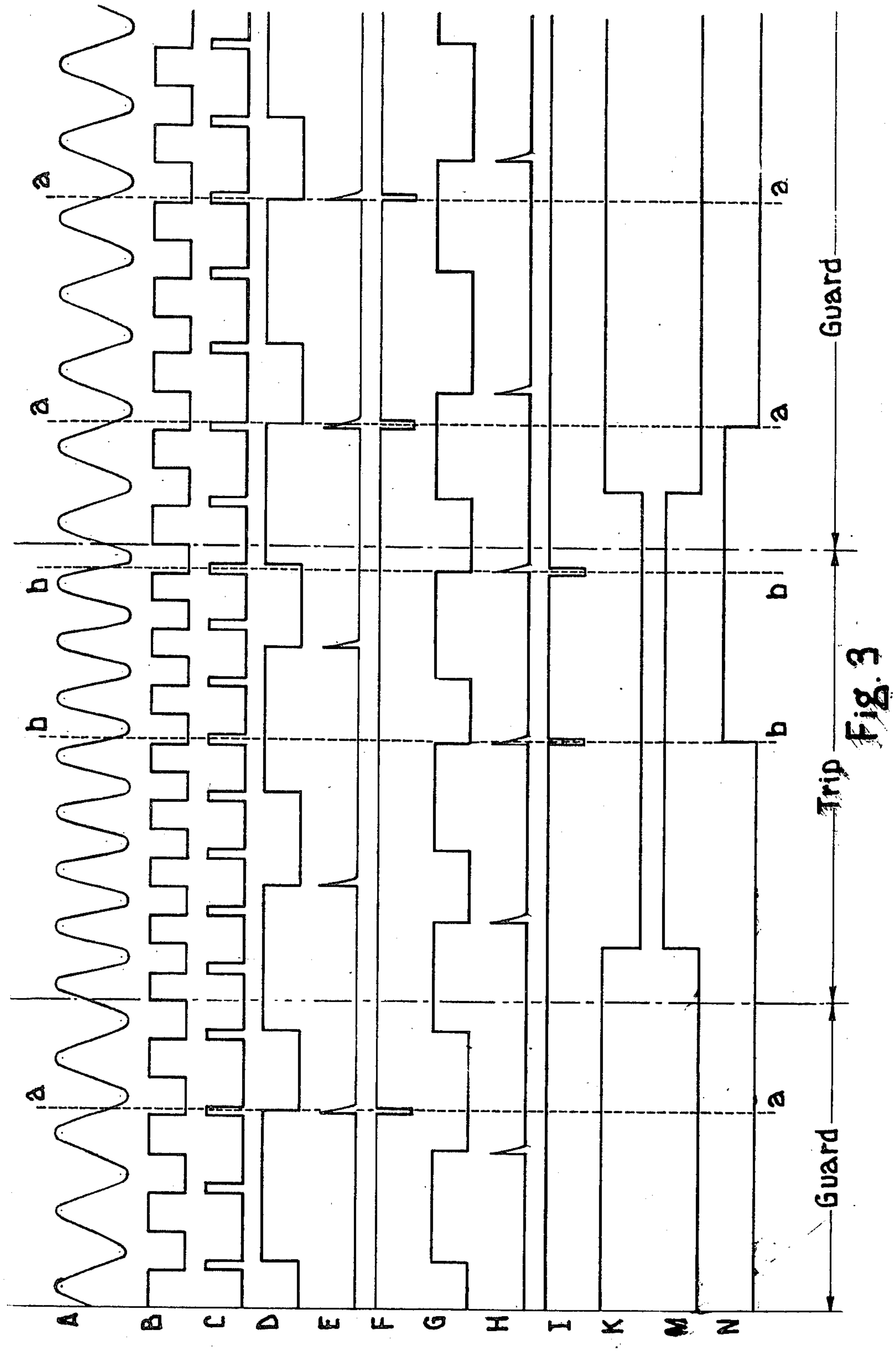
FIG. 3 is a set of waveforms illustrating the operation of the receiver.

Referring now to FIGS. 1*a* and 3, in the receiver the received signal (see FIG. 3A) is applied to a filter 1 having a band-pass characteristic shaped to select signals having frequencies within the channel for which the receiver is intended and to provide impedance matching of the receiver to the transmission line in the filter pass band and a high impedance outside the filter pass band.

FIG. 3A shows the guard frequency present initially followed by a short period of transmission of the trip frequency after which the guard frequency is again transmitted.

The output from the filter is fed to an attenuator 2 to produce at the attenuator output a signal of a predetermined level. An amplifier 3 amplifies the attenuated signal and the amplified output signal is fed to a squarer 4 whose output consists of a train of positive-going pulses whose leading and trailing edges correspond respectively to the positive-going and negative-going zero cross-overs in the received signal (see FIG. 3B).

The output of the squarer 4 is applied to a differentiating circuit D1 whose output is uitilised to trigger a main monostable circuit 5 which produces a pulse having a duration substantially less than the duration of a half cycle of the trip frequency in response to each negative-going output pulse of the differentiating circuit. Thus, the stages of the receiver up to and including the monostable 5 constitute a pulse generator for producing a train of pulses at a repetition frequency equal to the frequency of the received signal, the pulse train appearing at the output of the monostable 5, see FIG. 3C.

The output of the monostable circuit 5 is applied to a pair of frequency recognition circuits FRG and FRT to determine whether the pulse train, and hence the received signal, is at the guard or trip frequency.

Each of the frequency recognition circuits consists of a first differentiating circuit D2 or D3, a monostable circuit 6 or 9, a second differentiating circuit D4 or D5, an inverter 7 or 10 and a gate circuit 8 or 11. The guard gate 8 produces an output signal when the received signal is within a narrow band having the guard frequency at the centre and the trip gate 11 produces an output when the received signal is within a narrow band having the trip frequency at the centre. The outputs from the gates 8 and 11 are connected to an output bistable circuit 12 which is triggered by these outputs between guard and trip states. The bistable circuit 12 produces an output, which is fed to a relay circuit 13.

The operation of the frequency recognition circuits will now be described.

The guard monostable 6 is triggered by the negative-going output pulses of the differenting circuit D2 which are produced in response to the trailing edges of the pulses at the output of the main monostable 5. As shown in FIG. 3D the duration of the output pulses of the monostable 6 is twice the period of the guard frequency. In addition the monostable 6 is arranged to remain in its stable state after returning thereto from its unstable state for a period of one cycle of the guard frequency. Thus a succession of spaced pulses of a duration twice the period of the guard frequency appear at the output of the guard monostable 6.

The negative-going output pulses of the differentiating circuit D4 produced in response to the trailing edges of the pulses at the output of the guard monostable 6 are inverted in the inverter 7 so that at a first input of the guard gate 8, which is a three-input NAND gate, a succession of positive-going pulses appears (see FIG. 3E) corresponding to the trailing edges of the output pulses of the guard monostable 6.

The output pulses of the main monostable 5 are applied to a second input of the guard gate 8 so that, assuming for the moment the gate 8 is not inhibited by its third input, a pulse appears at the output of the guard gate 8 each time pulses in waveforms C and E in FIG. 3 coincide, as shown at *a—a* in FIG. 3.

It will be appreciated that due to the duration of the output pulses of the guard monostable 6 being a multiple of the period of the guard frequency and the narrow width of the output pulses of the main monostable 5, pulses will appear at the output of the guard gate 8 (see FIG. 3F) only when the frequency of the received signal is within a narrow band centred on the guard frequency, the width of this narrow band being determined by the width of the output pulses of the main monostable 5.

In a similar manner the trip monostable 9 is triggered via differentiating circuit D3 to produce spaced pulses having a duration equal to twice the period of the trip frequency (see FIG. 3G) in response to the trailing edges of the output pulses of the main monostable 5. The trailing edges of the output pulses of the trip monostable 9 are then differentiated in differenting circuit D5 and inverted in inverter 10 and the resulting positive-going pulses (see FIG. 3H) are applied to a first input of the trip gate 11 which is also a three-input NAND gate. The output of the main monostable 5 is applied to a second input of the trip gate 11 so that a pulse appears at the output of the trip gate 11 each time the pulses in waveforms C and H in FIG. 3 coincide, as shown at *b—b* in FIG. 3, so long as the gate 11 is not inhibited by its third input.

Thus, pulses appear at the output of the trip gate 11 (see FIG. 3I) only when the frequency of the received signal is within a narrow band centred on the trip frequency, the width of this narrow band also being determined by the width of the output pulses of the main monostable 5.

The outputs of the guard and trip gates 8 and 11 are utilised to operate the bistable circuit 12 so that the bistable circuit assumes or remains in a first state in response to each output pulse of the guard gate 8, and assumes or remains in a second state in response to each output pulse of the trip gate 11, the first and second states being hereinafter referred to as the guard and trip states. Thus, as shown in FIG. 3N, the bistable assumes the guard state in normal operation while the guard frequency is being received, and assumes the trip state each time the trip frequency is received long enough for a pulse to appear at the output of the trip gate 11, remaining in the trip state until the guard frequency is again received for a period long enough for a pulse to appear at the output of the guard gate 8, and so on.

The relay circuit 13 is arranged to operate when the bistable circuit 12 assumes the trip state, operation of the relay circuit 13 initiating any operation which may be desired to occur on occurrence of a fault eg tripping of a circuit breaker.

The receiver as described above is of generally known form and works satisfactorily in interference free conditions. In practice, however, there are various forms of interference which may occur and which can cause the receiver to operate incorrectly.

Firstly, white noise may be present on the transmission line causing receiver instability, i.e. causing the receiver to jump from the trip condition to the guard condition or vice versa. Thus, although the guard frequency is being transmitted, noise can cause a spurious change of the receiver to the trip condition so that the relay circuit 13 operates under no-fault conditions. Similarly, noise can cause a spurious change of the receiver from the trip condition to the guard condition.

Figure 1B:
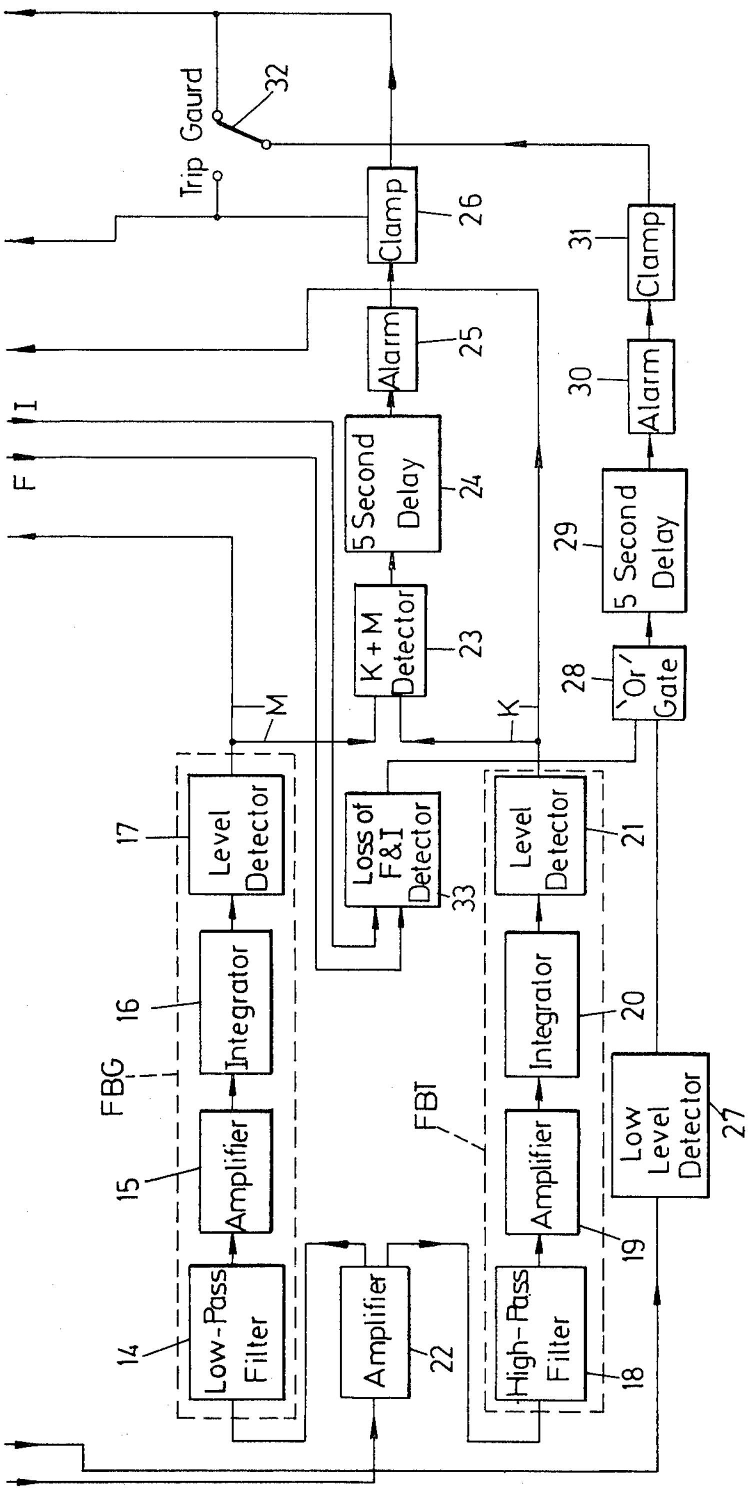
Figure 2:
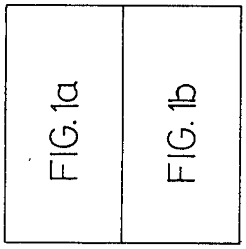
FIG. 2 shows how

Referring to FIG. 1*b*, in accordance with the invention the stability is increased by the provision of a third frequency recognition circuit FBG consisting of a low pass filter 14, an amplifier 15, an integrator 16 and a level detector 17 and a fourth frequency recognition circuit FBT consisting of a high pass filter 18, an amplifier 19, an integrator 20 and a level detector 21. Both circuits FBG and FBT are fed by the signal from the attenuator 2 of FIG. 1*a* through an amplifier 22. The low and high pass filters 14 and 18 both have a cut-off frequency between the narrow frequency bands recognised by the guard and trip frequency recognition circuits FRG and FRT of FIG. 1*a*. The output of the level detector 17 is applied to the third input of the trip gate 11 and the output of the level detector 21 is applied to the third input of the guard gate 8.

When the guard frequency is being received a continuous output is produced by the level detector 17 (see FIG. 3M) in response to the amplified, integrated guard frequency signal at its input of a value such as to inhibit the trip gate 11. Thus, whilst the guard frequency is being received, the trip gate 11 is positively prevented from producing output pulses, so that no spurious operation of the bistable circuit 12 to the trip state can occur due to noise on the transmission line.

At this time the output of the level detector 21 (see FIG. 3K) has a value such as to enable the guard gate 8 thereby permitting the gate 8 to produce output pulses to operate the bistable circuit 12 into the guard state.

When the received signal changes from the guard frequency to the trip frequency the output of the level detector 17 changes to a value such as to enable the trip gate 11, thereby permitting the trip gate 11 to produce output pulses and operate the bistable circuit 12 into the trip state.

At the same time the output produced by the level detector 21 changes in response to the amplified, integrated trip frequency signal at its input, to a value such as to inhibit the guard gate 8. Thus, whilst the trip frequency signal is being received the guard gate 8 is positively prevented from producing output pulses, so that no spurious operation of the bistable circuit 12 to the guard state can occur due to noise on the transmission line.

It will be appreciated that the frequency recognition circuits FBG and FBT operate over relatively wide frequency bands compared with the frequency recognition circuits FRG and FRT. This is in order that the required inhibition of the guard gate 8 or the trip gate 11 will occur despite the presence of noise.

Figure 4:
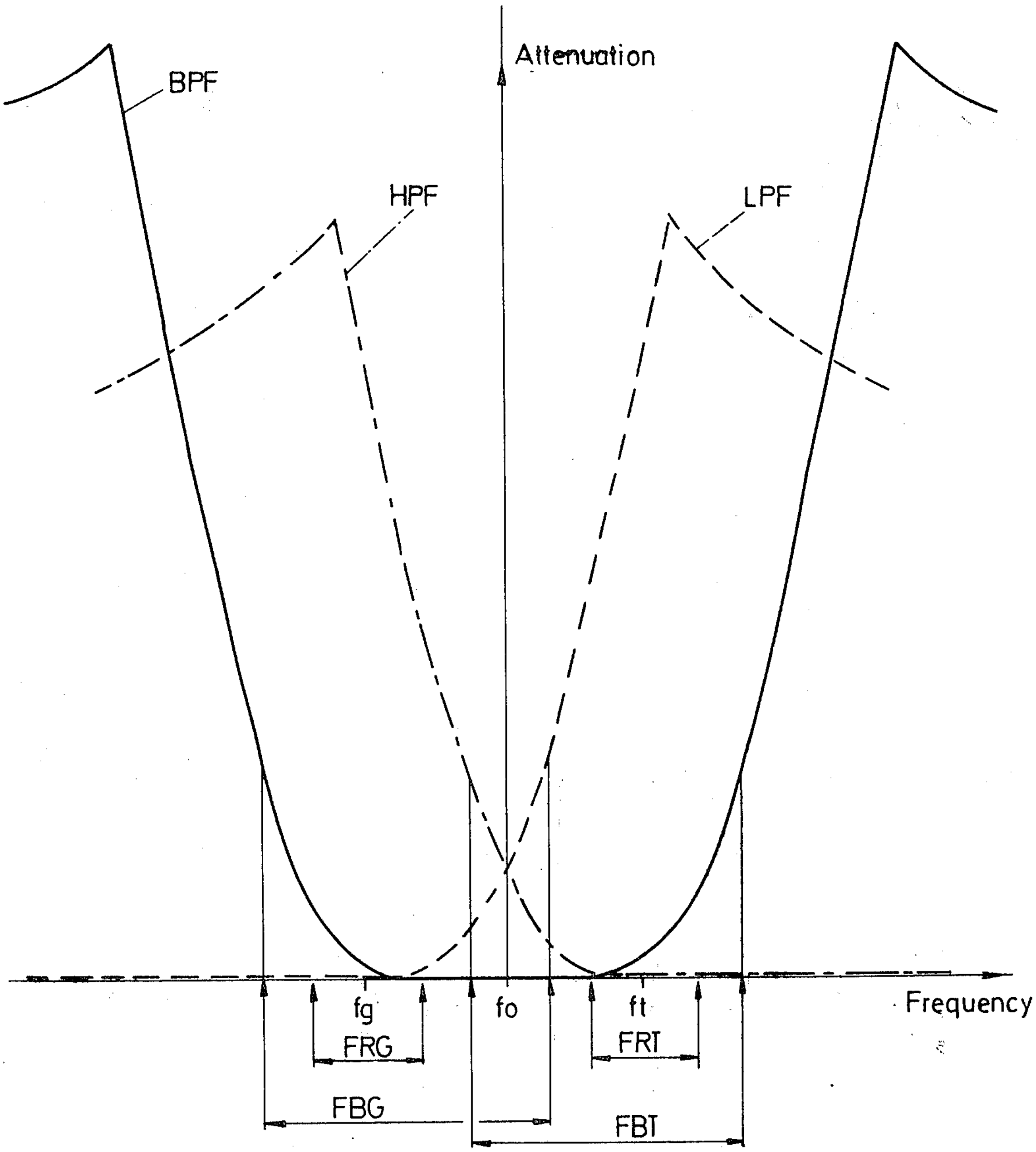
FIG. 4 is a graph illustrating the operation of the receiver.

The various frequency recognition bands are typically as illustrated in FIG. 4 where line HPF is the response characteristic of the filter 18, line LPF is the response characteristic of the filter 14, BPF is the response characteristic of the filter 1, fg is the guard frequency, ft the trip frequency and fo the channel centre frequency.

A second form of interference that can cause trouble is the presence of a spurious signal on the line. For example, during transmission of the guard frequency, a spurious signal at the trip frequency might be present on the line. To give a warning that this condition exists, the outputs from the level detectors 17 and 21 are fed to a coincidence detector circuit 23. A delay circuit 24 provides a 5 second delay to allow the condition to clear and then if the condition persists provides an output to an alarm circuit 25 which gives visual and/or audible warning. A further output from the alarm circuit 25 is fed to a clamp circuit 26 which provides an output to the bistable circuit 12 (FIG. 1*a*) to clamp this circuit in the guard state.

A further possibility that is guarded against is the loss of the transmitted signal, e.g. by accidental disconnection of the transmission line. For this purpose, the output from the amplifier 3 of FIG. 1*a* is fed to a low level detector 27 which produces an output if its input signal falls below a certain low value. The output from the detector 27 is fed to an OR gate 28 (the reason for using an OR gate will be explained below). A delay circuit 29 provides a 5 second delay and then if the condition persists actuates an alarm circuit 30 similar to the alarm circuit 25. A clamp circuit 31 fed by an output from the alarm circuit 30 provides a clamp signal to the bistable circuit 12 in parallel with the signal from the clamp circuit 26 to clamp this circuit 12 in the guard state.

Whilst the low level detector 27 will detect the fact that the received signal is low or entirely absent, it does not detect the situation where an incorrect line is connected carrying a signal at a frequency different from the guard and trip frequencies. To warn that this situation exists, the outputs from the guard gate 8 and the trip gate 11 are fed to a detector circuit 33 which produces an output when there is no output from either the guard gate 8 or the trip gate 11. The output from the detector circuit 33 is fed to the OR gate 28. Thus the alarm circuit 30 and the clamp circuit 31 will be actuated if the input signal falls below a predetermined level or if an incorrect signal is being received due to connection of an incorrect line.

In the above description the clamp 31 operates the bistable circuit 12 into the guard state. However, in certain circumstances it may be desirable that the relay circuit 13 operates in the event of conditions existing such as to operate the clamp 31, in which case the bistable circuit must be clamped in the trip state by the clamp 31. Therefore, an optional switch 32 is provided whereby the output from the clamp circuit 31 can be caused to clamp the bistable circuit in the guard or trip states. If coincidence between outputs from both clamp circuits 26 and 31 occurs when the switch 32 is in the trip position, the output from the clamp circuit 31 overrides the output from the clamp circuit 26.

I claim:

1. A receiver for use in a signalling system of the kind wherein data is conveyed by transmitting in sequence signal of a first frequency and signals of a second higher frequency comprising:

first and second frequency recognition circuits which respectively produce outputs in response to received signals in first and second discrete frequency bands in which said first and second frequencies lie respectively;

third and fourth frequency recognition circuits which respectively produce outputs in response to received signals in said first and second frequency bands;

a connection between the output of said third frequency recognition circuit and an input to said second frequency recognition circuit whereby the output of said second frequency circuit is inhibited in the presence of an output signal from said third frequency recognition circuit;

a connection between the output of said fourth frequency recognition circuit and an input to said first frequency recognition circuit whereby the output of said first frequency recognition circuit is inhibited in the presence of an output signal from said fourth frequency recognition circuit; and bistable output means connected with the outputs of the first and second frequency recognition circuits so as to assume a first condition in response to an output from the first frequency recognition circuit and to assume a second condition in response to an output from the second frequency recognition circuit.

2. A receiver according to claim 1 including a pulse generator which in response to received signals produces a train of pulses at a pulse repetition frequency corresponding to the frequency of the received signals, and wherein said first and second frequency recognition circuits each commprise:

a monostable circuit triggered from the pulse generator output to produce a train of pulses having a duration equal to a multiple of the duration of one cycle of said first or second frequency and gating means for producing an output pulse in response to the coincidence of the trailing edge of an output pulse of said monostable circuit, an output pulse from the pulse generator, and the absence of an inhibiting output from the fourth or third frequency recognition circuit.

3. A receiver according to claim 1 wherein said third and fourth frequency recognition circuits respectively include low and high pass filters having cut-off frequencies between said first and second frequency bands.

4. A receiver according to claim 3 including a bandpass filter via which the received signals are fed to the first, second, third and fourth frequency recognition circuits.

5. A receiver according to claim 3 wherein said third and fourth frequency recognition circuits each comprise: an integrator to which the output of said low pass or high pass filter, is applied; and a level detector which produces an inhibiting output when the output of said integrator exceeds a predetermined level.

6. A receiver according to claim 5 including a coincidence detector which produces an output in response to the simultaneous occurrence of inhibiting outputs at the outputs of said third and fourth frequency recognition circuits, and a clamp circuit connected between the coincidence detector and said bistable circuit to clamp the bistable circuit in a predetermined condition when the coincidence detector produces said output.

7. A receiver according to claim 6 including a low level detector which produces an output when the received signal falls below a predetermined level; an absence detector which produces an output when there is no output from either of said first and second frequency recognition circuits; and a clamping circuit connected between the low level and absence detectors and the bistable circuit for clamping the bistable in a predetermined condition when said low level detector or said absence detector produces an output.

* * * * *